(12) United States Patent
Shillito et al.

(10) Patent No.: US 6,830,069 B2
(45) Date of Patent: Dec. 14, 2004

(54) ISOLATION VALVE ASSEMBLY

(75) Inventors: Paul Shillito, Crewe (GB); Mark Oliver, Hale (GB)

(73) Assignee: Oliver Twinsafe Valves Limited (GB)

( * ) Notice: Subject to any disclaimer, the term of this patent is extended or adjusted under 35 U.S.C. 154(b) by 0 days.

(21) Appl. No.: 10/398,342

(22) PCT Filed: Jun. 13, 2001

(86) PCT No.: PCT/GB01/02574
§ 371 (c)(1),
(2), (4) Date: Aug. 27, 2003

(87) PCT Pub. No.: WO02/29303
PCT Pub. Date: Apr. 11, 2002

(65) Prior Publication Data
US 2004/0016463 A1 Jan. 29, 2004

(30) Foreign Application Priority Data
Oct. 6, 2000 (GB) .............................. 0024507

(51) Int. Cl.⁷ ........................... F16K 35/14; F16L 55/07
(52) U.S. Cl. ....................................... 137/613; 251/174
(58) Field of Search ......................... 137/613; 251/172, 251/174, 304, 315.01, 315.08

(56) References Cited

U.S. PATENT DOCUMENTS

| | | | |
|---|---|---|---|
| 2,948,553 A | 8/1960 | Gill et al. ......................... 284/4 |
| 3,382,892 A | 5/1968 | Cerbin ................... 137/614.02 |
| 4,276,905 A * | 7/1981 | Lourdeaux .................. 137/613 |
| 5,494,256 A * | 2/1996 | Beson ......................... 251/174 |
| 6,220,290 B1 * | 4/2001 | Lomax ........................ 137/613 |

FOREIGN PATENT DOCUMENTS

| | | | |
|---|---|---|---|
| GB | 805990 | 3/1957 | |
| WO | WO 98/31957 | 7/1998 | ........... F16K/47/04 |

OTHER PUBLICATIONS

PCT International Search Report for International Appln. No. PCT/GB01/02574; Published Apr. 11, 2002; (2 p.).

* cited by examiner

*Primary Examiner*—Kevin Lee
(74) *Attorney, Agent, or Firm*—Conley Rose P.C.

(57) ABSTRACT

An isolation valve assembly for use in a pipeline comprises a valve housing (1) body having inlet (12) and outlet (13) openings. In the housing there is disposed a pair of independently operable rotary valve balls (3) each having a port (25) therethrough The valve balls (3) are each rotatable between an open position in which the respective port is in communication with the adjacent opening and a closed position in which the valve ball closes the adjacent opening. A valve seat (9, 14) supports each valve ball in the housing and a valve seat retention member (10) is disposed in each of the openings (5). The retention member (10) defines a flow passage (11) therethrough for communication with the adjacent valve ball port and has a first end proximal to one of the valve balls. The first end supports said valve seat and a second end has means for engagement to the pipeline. The arrangement allow a relatively large bore valve assembly to have a length conforming to International Standard ANSI B16.10 or equivalent so as to enable a single ball valve assembly to be replaced with a double valve assembly without any modification to the pipework.

12 Claims, 3 Drawing Sheets

ISOLATION VALVE ASSEMBLY

The present invention relates to an isolation valve assembly and more particularly to an isolation ball valve assembly for incorporation in pipelines.

BACKGROUND

The current working practice in the pipework and plant installation industries (onshore and offshore) is, for safety reasons, to fit at predetermined locations within a fluid pipeline an isolation valve assembly in the form of two single ball valve units adjacent to one another. The ball valve units are flange-connected to one another and each is in turn flange connected to a respective adjacent pipeline end. The overall length of each ball valve unit is in accordance with International Standards such as ANSI B16.10, DIN and the like.

The ball valve units are both closed, for example, while workers are working downstream of the isolation valve assembly with the safety of the workers being ensured and maintained should one of the ball valve units fail.

A double ball isolation valve assembly having two ball valves mounted within a common housing is described in our UK Patent No. 2271164. The valve assembly enables two ball valves to be accommodated into a standard length for a single valve assembly. The described assembly is only suitable for use with pipelines having bores of up to and including about 2" (5.08 cm) since it uses floating balls. Such balls are permitted to float in an axial direction when they are in closed positions so as to prevent adverse loading on an operating stem attached to each ball and to compensate for expansion and contraction as a result of temperature changes. In pipelines having bores of greater that 2" (5.08 cm) diameter it is generally necessary to use trunnion-mounted ball valves as these are able to withstand the thrust generated by the greater pressures. The ball valves are fixed in position relative to the housing by the trunnions but are free to rotate relative to the valve seats that are spring loaded. Valve seats for trunnion valve balls take up a greater length than simple O-ring or other seats that can be used with floating ball valves. In view of this it has not so far been possible to provide a double ball valve assembly having a standard length for a single ball valve unit for use with the larger pipelines.

BRIEF SUMMARY

It is an object of the present invention to obviate or mitigate the aforesaid problem and to provide for an isolation valve assembly with a double ball valve assembly that is accommodated into the ANSI (or equivalent) length for a single ball valve.

According to the present invention there is provided an isolation valve assembly for use in a pipeline, the assembly comprising a valve housing body having inlet and outlet openings and in which is disposed a pair of independently operable rotary valve balls each having a port therethrough, the balls being rotatable between an open position in which the port is in communication with the adjacent opening and a closed position in which the valve ball closes the adjacent opening, a valve seat supporting each valve ball in the housing and a valve seat retention member disposed in one of the openings and defining a flow passage therethrough for communication with the adjacent valve ball port, the retention member having a first end proximal to one of the valve balls and which supports said valve seat and a second end for engagement with a pipe-fitting of the pipeline.

The provision of a valve seat retaining member that is disposed in the housing body allows the length of the valve assembly to be reduced in comparison to prior art designs such that the length of the assembly conforms to International Standard ANSI B16.10 or equivalent. This means that the assembly (with two valve balls) can be used to replace a valve assembly having a single valve ball in an existing pipeline without the need to modify the pipeline.

Preferably there is provided a valve seat carrier intermediate the retention member and the valve seat. The seat carrier may have a recess into which the valve seat is fitted.

Ideally the valve seat is biased towards the respective valve ball. The biasing force may be provided by a biasing member that is housed in a recess in the valve seat carrier or, alternatively, in a recess in the retention member.

The retention member is preferably substantially wholly received in housing and may be fixed to the housing body by, for example, at least one bolt or by threaded engagement therewith.

The valve balls are preferably each rotatably disposed on at least one trunnion.

There may be provided a recess for a seal in the second end of the retention member.

BRIEF DESCRIPTION OF THE DRAWINGS

Specific embodiments of the present invention will now be described, by way of example only, with reference to the accompanying drawings in which.

DETAILED DESCRIPTION

The isolation valve assemblies of the present invention satisfy international standards concerning flange size (ANSI B16.5), overall length (ANSI B16.10), valve ball bore diameters (API 6D), wall thicknesses (ANSI B16.34 Table 3 at ASME VIII) and operating pressures within each set design parameters.

Figure 1:
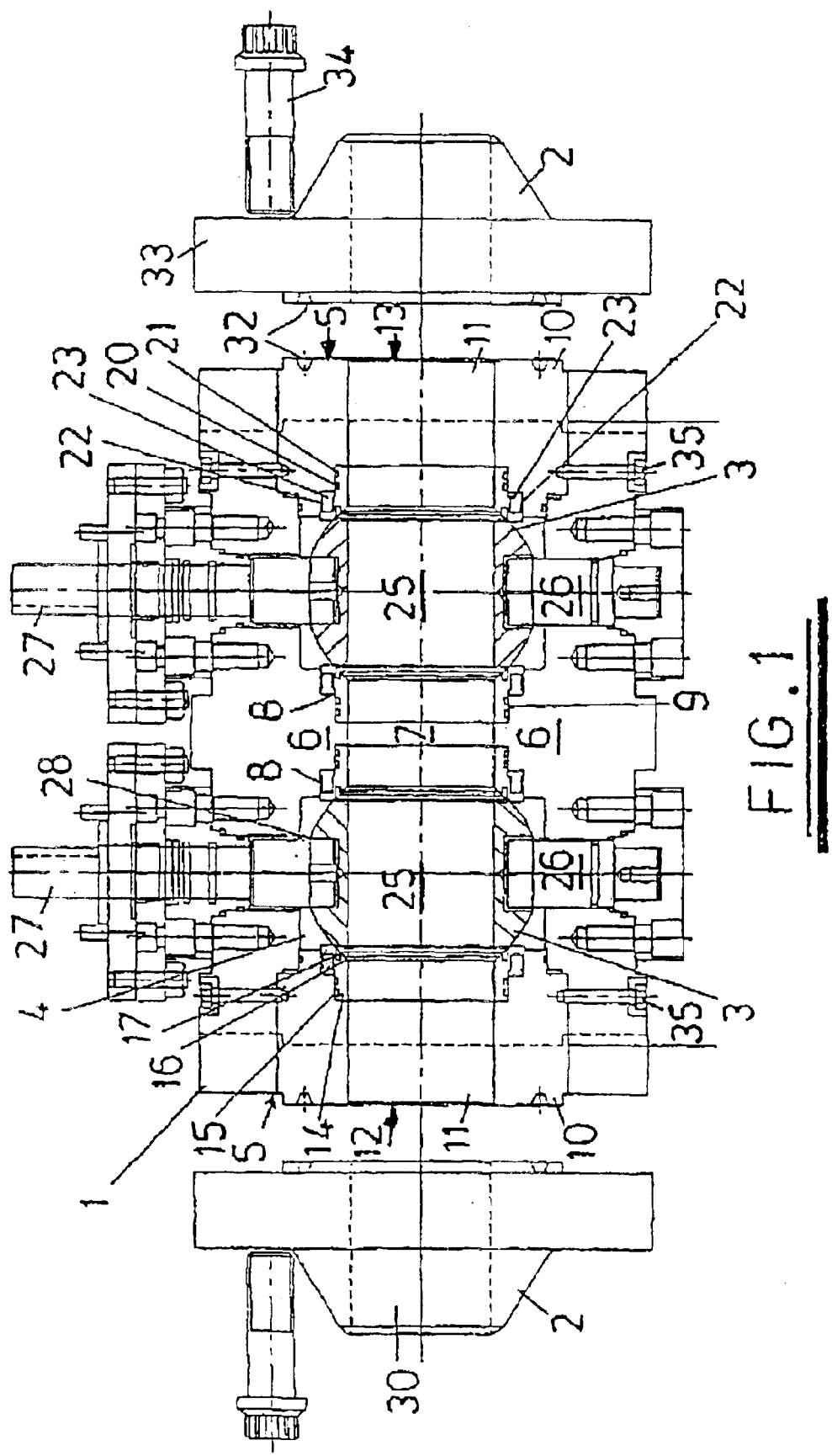
FIG. 1 is a part sectioned longitudinal view of a first embodiment of an isolation valve assembly of the present invention.

Referring now to FIG. 1 of the drawings, the exemplary isolation valve assembly is a double ball valve unit comprising a housing body 1 of standard length for connection into a pipeline by pipe fittings 2, and a pair of valve balls 3 mounted within a valve chamber 4 in the housing 1.

The housing 1 is manufactured from, for example, steel and has an opening 5 at each end through which the valve balls 3 are inserted. The valve chamber 4 is separated into two by a central wall 6 penetrated by a central port 7 to allow fluid communication between the two parts of the chamber 4. The central wall 6 has a stepped recess 8 on each side for receipt of a valve seat carrier 9. The housing openings 5 at each end are partially closed by a valve seat retaining member 10 that is generally annular with a central port 11 to define the fluid inlet 12 and outlet 13 for the valve assembly. The end of the retaining member 10 adjacent each valve ball 3 holds a further valve seat carrier 14 in a stepped recess 15. Each of the valve seat carriers 9, 14 has a first end with concave surface 16 complementary to the spherical surface of the valve ball 3 and which is recessed to receive a valve seat 17 (made from, for example, a polymer or metal). The opposite end of the valve seat carrier 9 is stepped so as to fit into the stepped recess 8, 15 of the central wall 6 or retaining member 10 and has annular circumferential recesses that support O-ring and grafoil (fire resistant) seals 20, 21 and axial recesses 22 that support biasing springs 23 for urging the seat carrier 9 towards the valve balls 3.

Each of the valve balls 3 has a port 25 therethrough for communication with the inlet 12, outlet 13 and central ports 7 and is rotatably mounted on a fixed trunnion 26 that projects through a wall of the housing 1 into the valve chamber 4. The valve balls 3 are rotatable by means of stems 27 engaged in sockets 28 in the valve balls 3 diametrically opposite each trunnion 26. The opposite ends of the stems 27 are connected to suitable actuators (not shown in FIG. 1) for rotation of the valve balls 3 between open positions in which their ports 25 are in axial register with the inlet 12, outlet 13 and central ports 7 and closed position in which the valve ball ports 25 are not in communication with other ports 12, 13, 7.

The end of the retaining members 10 opposite the valve seat carriers 9 is designed to engage sealingly with a pipe fitting 2 of the pipeline such that the inlet 12 and outlet ports 13 are in register with the pipe conduit 30. The end faces of the retention members 10 and pipe fitting 2 each have an annular groove 32 for receipt of a seal (not shown). Each pipe fitting 30 has a flange 33 that is connected to the housing body 1 of the assembly by means of axially extending bolts 34 (only one on each side shown).

The retention members 10 are secured in place in the housing 1 by means of a plurality of bolts 35 as shown. The retention members 10 may be manufacture from any suitable material such as steel.

The above described design enables two ball valves to be arranged in a housing that has a length equivalent to the international standard for a single ball valve housing. The length of the assembly shown in FIG. 1 is 549 mm which is the ANSI standard B16.10 for a 4" bore class 1500 ball valve. The dotted vertical lines indicate the ends of a smaller version of the same design having a length of 460 mm which is the ANSI standard B16.10 for a 4" bore class 900 ball valve. This is made possible by the provision of an interfacing retention member which itself is wholly or substantially wholly received in the housing of the assembly and holds in place the internal components such as the valve seats and carriers. It also engages directly with the pipework into which the valve assembly is to be fitted. This removes the need for flanges at each end of the valve assembly. The same configuration can be provided for other size bores such as 3", 6", 8", 10" and upwards.

During assembly each valve balls 3 can be inserted into the housing 1 through the respective opening 5 at the end of the housing 1 and are then retained in place by insertion of the retention members 10 and the valve seat carriers 9, 14 (with valve seats 17).

Figure 4:
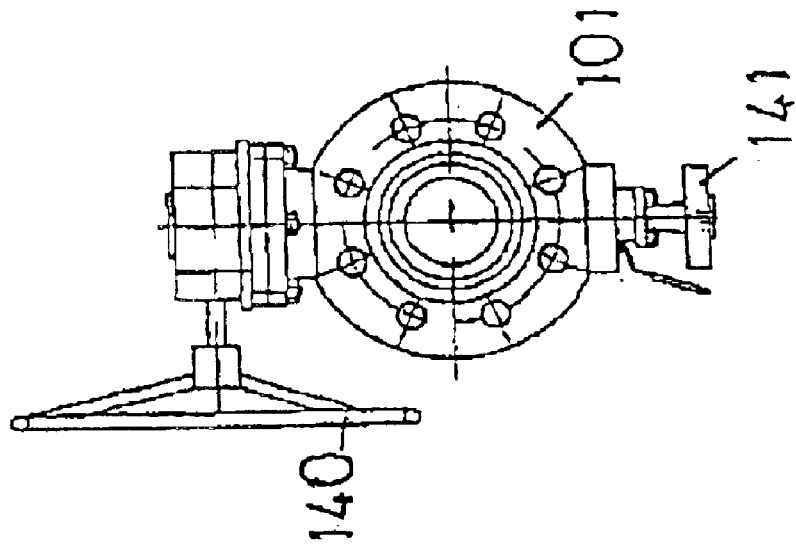
FIG. 4 is an end view of the assembly of FIG. 2.
Figure 2:
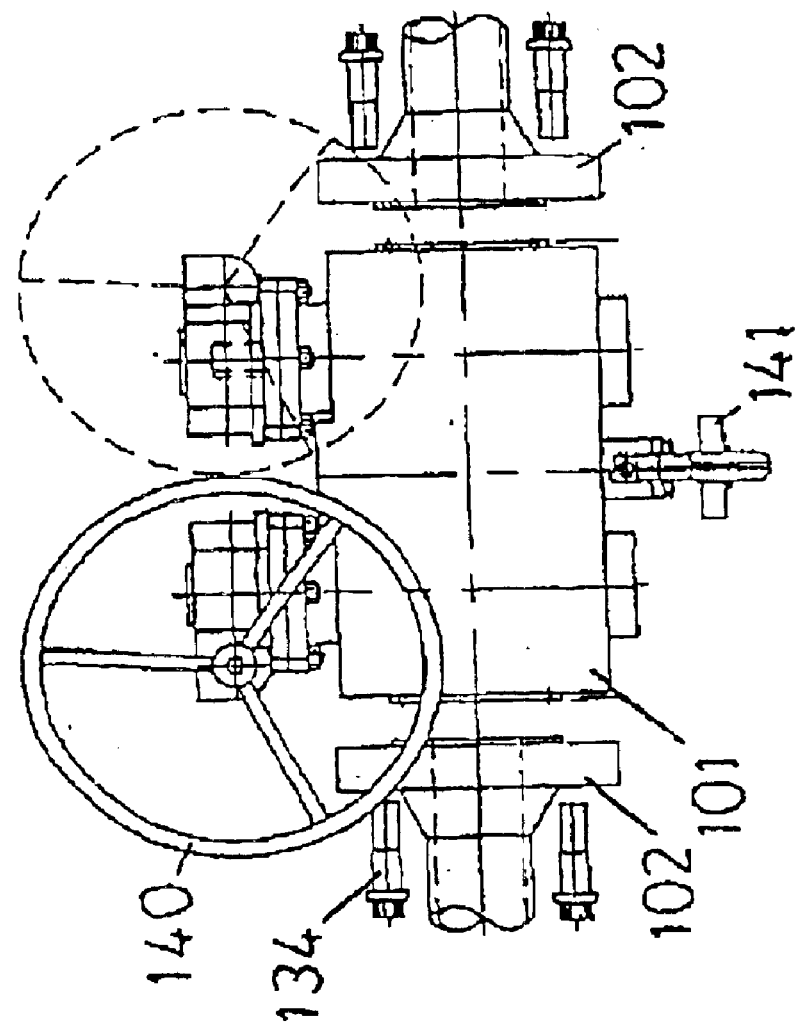
FIG. 2 is a plan view of a second embodiment an isolation valve assembly of the present invention.
Figure 3:
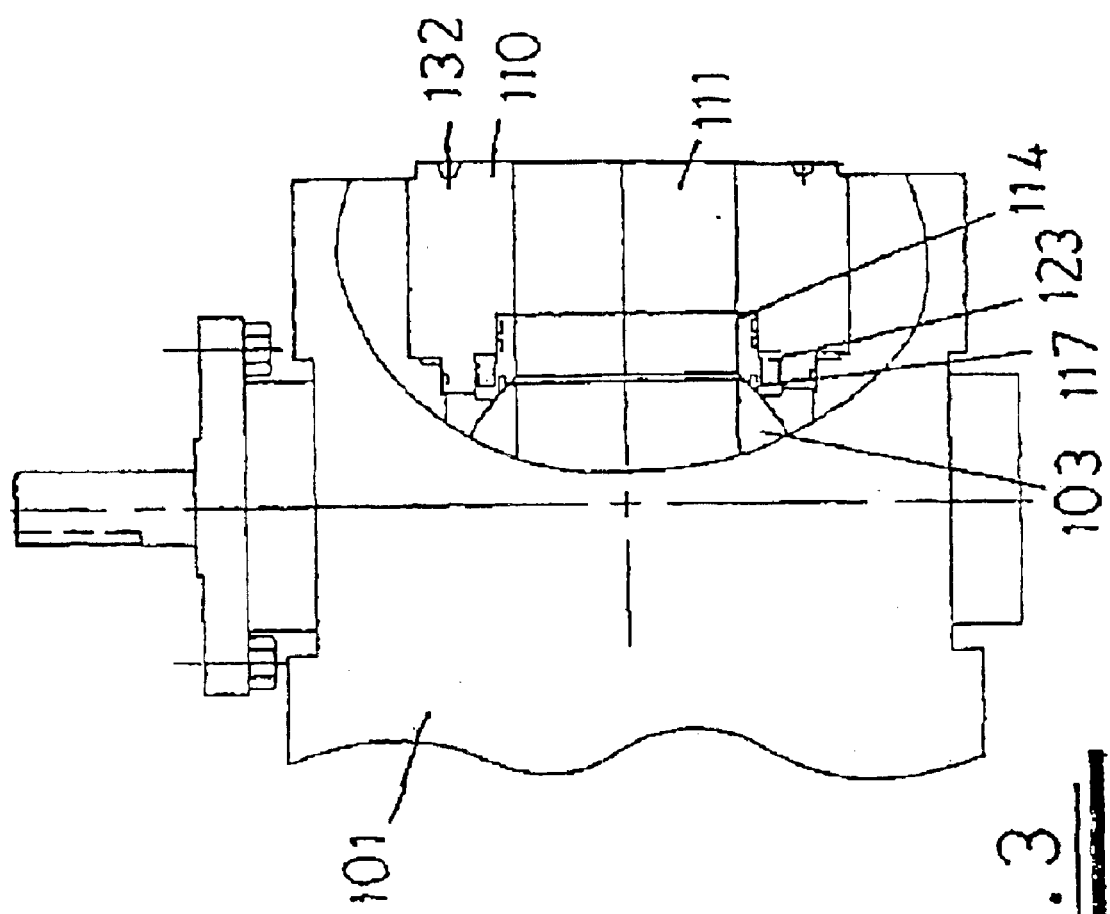
FIG. 3 is a fragmentary part cut away view of one end of the assembly of FIG. 2.

The embodiment of FIGS. 2 to 4 is substantially similar to that of FIG. 1 and parts corresponding to those of FIG. 1 are given the same reference numeral increased by 100 and are not further described except insofar as they differ from their counterparts in FIG. 1. The embodiment shows a single actuator 140 that is releasably connectable to each of the valve stems 127 to effect rotation of the associated valve ball 103 and an intermediate bleed valve 141. In this particular embodiment the retention member 110 is not secured to the housing by bolts.

It will be appreciated that numerous modifications to the above described design may be made without departing from the scope of the invention as defined in the appended claims. In particular, the retention member may be retained in the housing body by any appropriate means. For example the retention member may be threadedly connected into the inlet or outlet of the housing. In addition, the valve seat may be biased against the valve ball by a spring member disposed in a recess in the retention member rather than the valve seat carrier.

We claim:

1. An isolation valve assembly for use in a pipeline, the assembly comprising:
   a one-piece valve housing body having inlet and outlet openings and in which is disposed a pair of independently operable rotary valve balls each having a port therethrough, the balls being rotatable between an open position in which the port is in communication with the adjacent opening and a closed position in which the valve ball closes the adjacent opening,
   a valve seat supporting each valve ball in the housing;
   a valve seat retention member disposed in at least one of the openings and defining a flow passage therethrough for communication with the adjacent valve ball port, the retention member being connected to the housing body and having a first end proximal to one of the valve balls and which supports said valve seat and a second end for engagement with a pipe-fitting of the pipeline, wherein the retention member receives said valve seat and wherein the retention member is substantially wholly received in said valve housing body with the second end of the retention member being adapted to sealingly engage the pipe fitting.

2. An isolation valve assembly according to claim 1, wherein the retention member is fixed to the housing body by means of at least one bolt.

3. An isolation valve assembly according to claim 1, wherein the retention member is fixed to the housing body by threaded engagement.

4. An isolation valve assembly according to claim 1, wherein there is an intermediate wall between the valve balls, the wall supporting on each side said valve seat for each valve ball.

5. An isolation valve assembly according to claim 1, wherein the housing body has connecting means for fastening the assembly to the pipe-fitting of the pipeline and the retention member is designed for abutting engagement with the pipe-fitting.

6. An isolation valve assembly for use in a pipeline, the assembly comprising:
   a valve housing body having inlet and outlet openings and in which is disposed a pair of independently operable rotary valve balls each having a port therethrough, the balls being rotatable between an open position in which the port is in communication with the adjacent opening and a closed position in which the valve ball closes the adjacent opening;
   a valve seat supporting each valve ball in the housing;
   a valve seat retention member disposed in one of the openings and defining a flow passage therethrough for communication with the adjacent valve ball port, the retention member having a first end proximal to one of the valve balls and which supports said valve seat and a second end for engagement with a pipe-fitting of the pipeline;
   a valve seat carrier intermediate the retention member and each valve seat.

7. An isolation valve assembly according to claim 6, wherein the valve seat carrier is biased towards the respective valve ball by a biasing member.

8. An isolation valve assembly according to claim 6, wherein the biasing member is housed in a recess in the valve seat carrier.

9. An isolation valve assembly according to claim 6, wherein the biasing member is housed in a recess in the retention member.

10. An isolation valve assembly according to claim 1, wherein the length of the assembly conforms to International Standard ANSI B16.10 or equivalent.

11. An isolation valve assembly for use in a pipeline, the assembly comprising:

a valve housing body having inlet and outlet openings and in which is disposed a pair of independently operable rotary valve balls each having a port therethrough, the balls being rotatable between an oven position in which the port is in communication with the adjacent opening and a closed position in which the valve ball closes the adjacent opening;

a valve seat supporting each valve ball in the housing; and a valve seat retention member disposed in one of the openings and defining a flow passage therethrough for communication with the adjacent valve ball port, the retention member having a first end proximal to one of the valve balls and which supports said valve seat and a second end for engagement with a pipe-fitting of the pipeline, wherein the valve balls are rotatably disposed on at least one trunnion.

12. An isolation valve assembly for use in a pipeline, the assembly comprising:

a valve housing body having inlet and outlet openings and in which is disposed a pair of independently operable rotary valve balls each having a port therethrough, the balls being rotatable between an open position in which the port is in communication with the adjacent opening and a closed position in which the valve ball closes the adjacent opening;

a valve seat supporting each valve ball in the housing; and a valve seat retention member disposed in one of the openings and defining a flow passage therethrough for communication with the adjacent valve ball port, the retention member having a first end proximal to one of the valve balls and which supports said valve seat and a second end for engagement with a pipe-fitting of the pipeline, wherein there is provided a recess for a seal in the second end of the retention member.

* * * * *